United States Patent Office 3,795,650
Patented Mar. 5, 1974

3,795,650
CLAY THIXOTROPE FOR POLYESTER RESINS AND USE THEREOF
Robert A. Burns, Long Valley, N.J., assignor to Engelhard Minerals & Chemicals Corporation, Township of Woodbridge, N.J.
No Drawing. Filed Oct. 16, 1972, Ser. No. 297,701
Int. Cl. C08g 51/50
U.S. Cl. 260—33.4 R       5 Claims

ABSTRACT OF THE DISCLOSURE

A thixotrope in the form of a gelatinous paste is produced by dissolving a small amount of a liquid polyol in a liquid unsaturated polyester resin, thereafter adding approximately 20 percent by weight of a finely divided grade of colloidal clay, preferably powdered attapulgite clay, and then applying mechanical work (shear) to the mixture. The ratio of clay to polyol in the paste is in the range of about 3 to 6:1. To impart thixotropy to a cut polyester resin, the gelatinous paste is added in amount such that the clay content of the resulting thixotropic composition is less than about 3 percent by weight and the free polyol content is less than 0.5 percent by weight.

BACKGROUND OF THE INVENTION

In producing so-called hand layup moldings, a solution of an unsaturated polymerizable polyester resin in a copolymerizable monomer is applied to a fibrous glass mat by brushing or spraying. The resin is formulated with an activator, usually a cobalt salt, and a catalyst, usually an organic peroxide such as methylethyl ketone peroxide. Curing takes place at ambient temperature.

It is conventional to modify the rheology of such resin solutions before they are applied to the glass fibers in order to avoid drainage from vertical or inclined surfaces. It is not feasible to use polyester resins which have high viscosity because such resins would be difficult to apply and they would not thoroughly impregnate the fibrous reinforcements. Further, high viscosity resins would tend to entrap air. Properly formulated resins should possess all of the properties of low or medium viscosity resins except that they should be capable of remaining in place on vertical or inclined surfaces without drainage. In other words, the resins should be thixotropic.

The selection of suitable thixotropes for polyester resins is limited by cost factors. Further, it is essential to avoid the use of any additive which will impair storage stability by inducing sedimentation or which will interfere with or be rendered less effective by the activator and/or the catalyst. Further, it is normally desirable to avoid a thixotrope which will opacify the resin, thereby obscuring the possible presence of undesirable air bubbles.

Pyrogenic silica, supplied as a fine fluffy powder, is commercially used to impart thixotropy to liquid polyester resin solutions. The silica is expensive as compared to naturally-occurring colloidal mineral thickening agents such as clays. However, clay thickening agents of the types used, for example, to impart pseudoplastic properties to aqueous drilling muds or suspension fertilizers, must be used in relatively large amounts, as compared to pyrogenic silica, in order to impart thixotropic properties to liquid unsaturated polyester resins. When colloidal clay is added in excessive amount, e.g., more than about 4 percent to 5 percent of the resin weight, the resin loses its transparency. Furthermore, prolonged or high shear agitation is required to disperse colloidal clay in liquid unsaturated polyesters. Adequate thickening is not obtained by the mild mixing which suffices with the pyrogenic silica.

Organic surface active agents such as certain nonionic and cationic compounds improve the thickening properties of colloidal clays in a wide variety of organic liquids. Such agents are used in formulating clay-based greases. However, these surfactants are unsuitable for use in the liquid polyester resins because they interfere with the activators and catalysts used in the production of the cured resins.

Thus, the possible use of colloidal clays to impart thixotropy to liquid unsaturated polyester resins has awaited the discovery of means for utilizing the clay whereby less than about 4 percent clay would be required and any additive employed as an adjuvant to the clay to impart thixotropy would not impair the cure rate of the resin or otherwise interfere with the conventional activators and catalysts.

THE INVENTION

Accordingly, a general object of the invention is to provide a technique for thickening liquid unsaturated polyester molding resins with small amounts of colloidal clay without introducing materials which interfere with the cure or transparency of the resin.

Another object is to produce clay-based compositions which, when mildly mixed into liquid unsaturated polyester resins, impart satisfactory thixotropy without impairing the cure properties.

A specific object is to provide a clay-thickened gel concentrate containing a polyol constituent, which concentrate, when stirred into an unsaturated polyester resin, renders the resin thixotropic without introducing more than 4 percent clay or more than 0.5 percent polyol.

Another object is to provide a thixotrope for polyester resins in a form which avoids dusting problems associated with the use of any powdered thixotrope.

This invention results from my discovery that colloidal crystalline clays impart thixotropic properties to polyester resins with the aid of extremely small amounts of a lower polyol when the colloidal clay and the polyol are incorporated with each other, prior to addition to the resin to be thickened, in a specific manner hereinafter described.

Briefly stated, in accordance with the instant invention, an improved thixotrope for polyester resins is provided in the form of a paste-like gel by dissolving a small amount of a polyol containing at least 3 carbon atoms with a liquid unsaturated polyester resin, thereafter incorporating, with agitation, from about 15 percent to 25 percent by weight of a colloidal crystalline clay thickening agent, preferably a colloidal grade of attapulgite clay, employing a weight ratio of colloidal clay to polyol in the range of 3 to 6:1, preferably about 5:1, and thoroughly mixing the ingredients. The paste-like gel thus produced is mixed into a liquid resin solution in an amount sufficient to provide the desired thixotropic index (defined hereinafter), the amount being such that the quantity of polyol in the thickened resin does not exceed 0.5 percent by weight and the amount of colloidal clay is less than about 3 percent by weight.

Thus, the essence of my invention resides in a specific method for incorporating colloidal clay with a polyol adjuvant for imparting thixotropy to a polyester resin solution. The invention does not reside broadly in the use of a polyol to enhance the utility of colloidal clay as a thixotrope.

PRIOR ART

U.S. 3,632,545 to Charles F. Ferraro relates to the use of a premixed solid blend of a specific type of colloidal chrysotile (asbestos) with a polar liquid to impart thixotropy to polyester resins for hand layups. The asbestos, referred to as "MCS" in the patent, is slurried with a polar liquid such as a glycol to produce a dry blend in which the weight ratio of mineral to glycol is from about 1:2 to about 2:1. A similar disclosure appears in a publication by Dr. Ferraro, "Preblended Thixotropic Agents for Polyester Molding Compounds," Modern Plastics, November 1969, pp. 98 to 100. The preblending technique suggested for use with the crystalline asbestos is completely unsatisfactory when colloid clay such as attapulgite is substituted for the "MCS" because the amount of polyol required when employing the clay exceeds a desirable limit.

I am also aware of the fact that lower polyols such as diethylene glycol have been suggested for use with colloidal clays to improve the thickening properties of the clays in a variety of organic liquids. U.S. 2,885,360 to Haden et al. discloses that the glycols gel organic liquids previously thickened by colloidal attapulgite clay in conjunction with surfactants. Polar surfactants which would interfere with the cure of polyester resins are not used in practicing my invention.

I am also aware that it has been suggested to use polyols with certain colloidal clays to effectuate the thickening properties of the clays. Reference is made to U.S. 3,227,657 to Haden et al. and U.S. 2,766,209 to Marshall et al. In the procedures suggested in these patents, costly heat treatments and processing are required. The method of the subject invention avoids the controlled drying or dehydration steps required in carrying out the methods of the patents to Haden et al. and Marshall et al.

U.S. 3,631,144 to Deis et al. is concerned with the chemical thickening of polyester resins and describes the addition of 0.1% to 5.0% liquid polyol in conjunction with magnesium hydroxide. Chemically thickened polyesters are used in a different manner from resins employed for hand layups and the rheological properties imparted by the combination of polyol and magnesium hydroxide, as described in the patent, would be unsuitable in resins intended for molding by the hand layup procedure.

DETAILED DESCRIPTION

The colloidal clay material used in putting my invention into practice is a colloidal grade of attapulgite clay, sepiolite clay or montmorillonite clay (e.g., a sodium bentonite or hectorite). Mixtures of colloidal clays may be used. The term "colloidal clay" refers to a clay which can be dispersed in water into ultimate crystalline particles in the submicron size range to produce a gel-like structure. Pure clay minerals of the attapulgite, sepiolite or montmorillonite types may be used.

The preferred colloidal clay used in putting in my invention into practice is a colloidal grade of attapulgite clay which has been fluid energy milled in the presence of a small amount (e.g., ½ percent to 5 percent by weight) of added hydratable magnesium or magnesium hydroxide and is supplied in the form of a fine powder. The preparation of such clay is described in U.S. 3,205,082 to Buffett. The pertinent disclosure of the Buffett patent is incorporated herewith.

Typical samples of this clay product, available commercially as "Attagel® 50," have free moisture content in the range of 8 percent to 10 percent by weight and contain about 0.5 percent to 2 percent MgO extractable with ammonium chloride. The pH of "Attagel 50" is within the range of 9.2 to 9.6. This modified attapulgite clay generally produces better results than other powdered (finely milled) colloidal grades of attapulgite clay and is also superior to granular grades of colloidal attapulgite clay such as the drilling mud grades.

The polyols used in carrying out my invention must be water-soluble, soluble in solutions of polyester resins and must contain at least 3 carbon atoms per molecule. Diethylene glycol is especially preferred because of its low cost and availability. Other suitable polyols include propylene glycol, glycerol, hexylene glycol, triethylene glycol and sorbitol. Generally, suitable polyols contain from 3 to 7 carbon atoms per molecule.

The liquid unsaturated polyester resins used in preparing the gelled thixotrope are well known in the art. Such resins are prepared by dissolving a precondensed linear polyester in a monomeric polymerizable compound containing an ethylenic bond and capable in the presence of a peroxide catalyst of crosslinking the linear polymer into a rigid three-dimensional gel. The linear polyester is obtained by the condensation of an aromatic or ethylenic dicarboxylic acid, e.g., maleic anhydride, fumaric acid, itaconic acid alone or in combination with adipic acid, succinic acid, phthalic acid or isophthalic acid, with a polyol such as propylene glycol or glycerol. The monomeric compound used for crosslinking the precondensed linear polyester contains an ethylenic group, preferably attached to a phenyl group. Examples are styrene, alpha-methyl styrene and divinyl benzene. The amount of monomer present is usually within the range of 20 percent to 50 percent, based on the weight of the polyester. The liquid resins usually contain inhibitors such as hydroquinone, toluhydroquinone or tertiary butyl catechol to prevent premature vinyl polymerization.

In putting my invention into practice, I produce the gelled, pasty thixotrope (hereinafter referred to as a "pregelled concentrate" or "pregel") in the following manner. A predetermined quantity of polyol is thoroughly mixed into the liquid polyester resin. After dissolving the polyol in the polyester, the powdered colloidal clay should be added gradually with mixing. The resulting composition must be thoroughly mixed before use. This may be done in a paint mill, a colloidal mill or any other mill capable of applying work to the composition.

The sequence of steps that is employed in preparing the pregel is critical, as are the relative proportions of ingredients that are used. For example, it is essential to dissolve the polyol in the liquid polyester before adding the colloidal clay in order to be able to utilize a desired small quantity of polyols. Sufficient colloidal clay must be employed to produce a pregelled concentrate which is sufficiently viscous to result in a paste amenable to the input of energy when shear is applied.

Generally, the pregel should be formulated to contain colloidal clay in amount within the range of about 15 percent to 25 percent, preferably about 18 percent to 22 percent by weight. The weight ratio of colloidal clay ("as is" clay weight basis, including absorbed or "free" moisture) to polyol should be within the range of 3 to 6/1, preferably about 5/1. When appreciably less than about 20 percent colloidal clay is added, the pregel may lack sufficient body to be worked unless excessive polyol is used. When excessive clay is used, the mixture will be dry, difficult to handle and not amenable to working. When insufficient polyol is used, e.g., when the clay to polyol ratio is appreciably above 6/1, the benefits of employing the polyol may be minimal. When the ratio of clay to polyol is appreciably above 6/1, the benefits of employing the polyol may be minimal. When the ratio of clay to polyol is appreciably below 3/1, too much polyol may be present in the pregel.

The pregel may be used to impart thixotropy to virtually any liquid unsaturated polyester resin. The resin to be thickened does not have to be identical to the resin present in the pregel. For example, the resin to be thickened may be the condensation product of maleic anhydride and an ether glycol mixed with 30 percent styrene monomer and containing a quinone inhibitor. The resin in the pregel may be an inhibited unsaturated polyester resin made from phthalic and maleic anhydrides, propylene glycol and divinyl benzene monomer.

Unless the liquid resin to be thickened already has a suitable viscosity, e.g., a Brookfield viscosity (10 r.p.m., No. 1 spindle) below 500 cp., the resin is usually cut with additional polymerizable monomer such as styrene before adding the thixotrope. Sufficient monomer is added to obtain desired viscosity, e.g., 200 to 300 cps. Sufficient thixotropic paste is then added to the resin to provide the desired rheological properties. In most cases sufficient thixotrope is incorporated to provide a thixotropic index of 1.5 or above, preferably above 2.0, and an apparent high shear viscosity (Brookfield 100 r.p.m. with No. 1 spindle) below 1000 cps., e.g., in the range of 500 to 700 cps. In the absence of thixotrope the thixotropic index of a suitably cut polyester resin solution is about 1.0.

Particularly noteworthy results were obtained with a pasty thixotrope containing about 75 percent of an uncut medium viscosity polyester resin (800 cps. viscosity), 21 percent "Attagel 50" and 4 percent diethylene glycol, all percentages being on a weight basis. The thixotrope thus produced was mixed into the same polyester resin cut with styrene to about 300 cps. in amount such that the thickened resin contained 2 percent clay (and thus 0.4 percent diethylene glycol). The thixotropic resin did not form a sediment for three weeks and all additives introduced in the thixotrope were present at levels which would not impair cure, reduce transparency or otherwise impair the properties of the polyester resin.

The polyester resin used in the illustrative examples was a commercial maleic-orthophthalic general purpose alkyd containing 30 percent by weight styrene monomer and hydroquinone and tertiary-butyl catechol as inhibitors. The resin has a viscosity of about 1000 cps. (Brookfield 10 r.p.m.).

Example I

In accordance with this invention, 3.6 parts by weight of the uncut polyester resin was placed in a glass container. Diethylene glycol was added in amount of 0.2 parts by weight. The sample was mixed for 5 minutes using a drill press agitator fitted with a saw tooth blade operated at 1500 r.p.m. After addition of diethylene glycol, "Attagel® 50" was gradually added over a period of about ½ hour. The sample was sheared by raising and lowering the blade, producing a thick paste. The paste was blended for 3 minutes with the drill press agitator operated at 3500 r.p.m. The ratio of "Attagel 50" to diethylene glycol in this preparation was 5/1.

The procedure was repeated using 3.6 parts by weight polyester, quantities of diethylene glycol to provide ratios of Attagel 50 to diethylene glycol of 3/1, 4/1 and 6/1 and "Attagel 50" in amount of 1 part by weight.

Portions of the pregels prepared by this procedure were dispersed in varying amounts of the same maleic-orthophthalic resin cut with styrene to a viscosity of 286 cps. at 77° F. A Cowles dissolver operating at about 4400 r.p.m. was used to mix the pregel in the resin. Mixing was for 5 minutes at room temperature.

The resulting samples of thickened polyester resin solutions were allowed to equilibrate for 2 hours. Viscosities were measured using a Brookfield LV Model Viscometer (No. 3 spindle). Readings were taken at 100 r.p.m. (after 1 minute), followed by 10 r.p.m. (after 5 minutes). Sample temperature was 77° F. From the readings thixotropic index ("T.I.") was calculated by dividing the viscosity at 10 r.p.m. by the viscosity at 100 r.p.m. The viscosity of the resin solution prior to addition of thixotrope was about 280 cps. at both 10 and 100 r.p.m., representing a T.I. of 1.0. The objectives were to modify the resin to a T.I. of at least 1.5, preferably 2.0 or above, and to an apparent Brookfield viscosity in the range of 500 to 1500 cps., preferably 700 to 100 cps., at 100 r.p.m., without introducing more than 4 percent clay or 0.5 percent polyol.

High shear Brookfield viscosities and thixotropic indices for samples containing 1 percent to 2 percent Attagel 50 at four ratios of Attagel 50 to diethylene glycol are reported in table form. Also reported in the table are results for the same resin solution thickened in accordance with present commercial practice with 1 percent pyrogenic silica ("Cab-O-Sil").

TABLE I.—USE OF ATTAGEL 50-DIETHYLENE GLYCOL-RESIN PREGELS AS THIXOTROPE FOR POLYESTER RESIN

| | Ratio Attagel 50 to diethylene glycol | Brookfield viscosity, cps. (100 r.p.m.) | T.I. |
|---|---|---|---|
| Percent Attagel 50:[1] | | | |
| 1 | 3/1 | 456 | 1.4 |
| 2 | 3/1 | 648 | 1.9 |
| 1 | 4/1 | 452 | 1.6 |
| 2 | 4/1 | 700 | 2.2 |
| 1 | 5/1 | 482 | 1.7 |
| 2 | 5/1 | 732 | 2.4 |
| 1 | 6/1 | 436 | 1.5 |
| 2 | 6/1 | 710 | 2.1 |
| Control (1% pyrogenic silica) | | 926 | 2.2 |

[1] Based upon total weight of resin solution in thickened resin.

Data in the table show that the use of 2 percent "Attagel 50," added as a pregel in a polyester resin with diethylene glycol, gave a thixotropic index comparable to that obtained with pyrogenic silica when the weight ratio of "Attagel 50" to diethylene glycol was 5/1, corresponding to the addition of 0.4 percent diethylene glycol based on the total weight of the thickened resin composition. This represented the use of the optimum proportion of "Attagel" and glycol in the pregal. At clay/glycol ratios of 3/1, 4/1 and 6/1, the desired thixotropic index at an acceptable 100 r.p.m. viscosity were also realized at 2 percent addition of "Attagel 50." In all of these thixotropic resins glycol was present in amount below the maximum tolerable limit of about 0.5 percent.

A comparison of data in the table for results with addition of pregels in amount to provide 1 percent "Attagel 50" with those for 2 percent "Attagel" shows, as expected, that the thixotropic index was always higher at 2 percent clay than at 1 percent. However, at the 1 percent clay level and with clay/glycol ratios within the range of 3 to 6/1, the thickened resins were still markedly thixotropic and had acceptable 100 r.p.m. viscosities.

All of the samples resisted settling for about 3 months.

Example II

Tests were carried out to demonstrate the desirability of using diethylene glycol with "Attagel 50" to thicken a polyester and to point out the criticality of using the combination as a pregel in which glycol is present with the resinous component before any of the colloidal clay is dispersed therein.

A pregel was prepared by mixing "Attagel 50" in a portion of the uncut polyester resin in the weight ratio of 1 part "Attagel" to 3.6 parts polyester. No polyol was added. Using a Cowles Dissolver, a portion of the resulting thick paste was dispersed in a styrene-cut polyester resin in amount such that the concentration of the "Attagel 50" in the cut resin was 2 percent by weight. Thixotropic index was 1.0, indicating that the resin containing dispersed clay was not thixotropic. Further, the suspension characteristics were unsatisfactory. Thus after the system stood for a week a sediment had formed.

The procedure was repeated but a small amount of diethylene glycol was added to the cut resin. Thixotropic index was about 1.2. Within 24 hours flocculation was observed, followed by complete sedimentation within a week.

Another pregel was formed except diethylene glycol was added after "Attagel 50" was mixed in the resin. This pregel was added to cut resin in amount corresponding to 2 percent "Attagel 50." Thixotropic index was 1.2. This sample showed flocculation within one week and complete sedimentation within a month.

The results of tests in Example II show that "Attagel 50" could be dispersed in a polyester resin by simple mechanical means. However, the dispersed "Attagel 50" did not form a gel structure. The formation of such structure required the addition of a polyol to overcome the inhibition to gellation and flocculation of the colloidal clay which determines the degree of gellation and hence the thixotropic properties. However, the results of Example II, analyzed in light of results in Example I, show clearly that the polyol should be present when the "Attagel" is initially dispersed in a polyester in order to overcome most effectively these inhibiting forces. By using a pregel wherein the polyol was present when the "Attagel" was dispersed, a reduced amount of glycol was required while attaining satisfactory thixotropy.

I claim:

1. A composition in the form of a paste-like gel and useful for thickening a liquid unsaturated polyester resin when mixed therewith, said composition consisting essentially of a liquid unsaturated polyester resin, a water-soluble polyol, and 10 percent to 25 percent by weight colloidal crystalline clay in a weight ratio of 3 to 6 parts by weight clay to 1 part by weight of said polyol, said polyol having been added to said resin prior to adding said clay and the ingredients having been thoroughly mixed after adding said clay.

2. The composition of claim 1 wherein said colloidal clay is attapulgite clay.

3. A composition in the form of a paste-like gel and useful for thickening a liquid unsaturated polyester resin when mixed therewith, said composition consisting essentially of a liquid solution of an unsaturated polyester resin, said resin comprising the reaction product of an ethylenically unsaturated polycarboxylic acid and a polyhydric alcohol and the solvent being an ethylenically unsaturated monomer copolymerizable with said polyester, from about 15 percent to 25 percent by weight of powdered colloidal attapulgite clay which had been fluid energy ground in the presence of hydratable magnesia in amount within the range of about 0.5 percent to 2 percent based on the weight of said clay, and diethylene glycol in proportion of 1 part by weight to 3 to 6 parts by weight of said colloidal clay, said composition having been obtained by dissolving said diethylene glycol in said liquid solution of polyester resin, thereafter adding said clay and shearing the resulting mixture.

4. A process for imparting thixotropy to a liquid polyester resin composition adapted to be used in hand layup molding which comprises mixing into the liquid polyester resin to be thickened a sufficient amount of the composition of claim 1 to produce a viscous composition having a thixotropic index above 1.5 and containing less than 0.5 percent polyol and less than 3 percent colloidal clay.

5. A process for imparting thixotropy to a liquid polyester resin composition adapted to be used in hand layup molding which comprises mixing into the liquid polyester resin to be thickened a sufficient amount of the composition of claim 3 to produce a viscous composition containing about 2 percent clay and less than 0.5 percent free polyol, said liquid poleyster resin to be thickened being a solution in styrene of an unsaturated polyester resin comprising the reaction product of an unsaturated polycarboxylic acid and a polyhydric alcohol, said resin solution having a Brookfield viscosity within the range of 200 to 500 cps. at 10 r.p.m. and a thixotropic index of about 1.0 before adding the gel composition of claim 3 and having a thixotropic index above 2.0 and a Brookfield viscosity within the range of 500 to 1000 cps. after adding the gel composition of claim 3.

References Cited

UNITED STATES PATENTS

| | | | |
|---|---|---|---|
| 3,632,545 | 1/1972 | Ferraro | 260—40 R X |
| 3,205,082 | 9/1965 | Buffett | 106—309 X |
| 3,227,657 | 1/1966 | Hodin et al. | 106—72 X |
| 3,631,144 | 12/1971 | Deis et al. | 260—40 R |

MORRIS LIEBMAN, Primary Examiner

S. M. PERSON, Assistant Examiner

U.S. Cl. X.R.

260—40 R, 860, 863

UNITED STATES PATENT OFFICE
CERTIFICATE OF CORRECTION

Patent No. 3,795,650         Dated March 5, 1974

Inventor(s) Robert A. Burns

It is certified that error appears in the above-identified patent and that said Letters Patent are hereby corrected as shown below:

Column 5 - line 68, "700 to 100 cps.," should read -- 700 to 1000 cps., --.

Column 6 - line 28, "pregal" should read -- pregel --.

Signed and sealed this 18th day of June 1974.

(SEAL)
Attest:

EDWARD M. FLETCHER, JR.                C. MARSHALL DANN
Attesting Officer                      Commissioner of Patents